July 7, 1970 L. GIDGE ET AL 3,519,509
NON-WOVEN NETWORK AND APPARATUS AND METHOD FOR MAKING SAME
Filed June 8, 1965 4 Sheets-Sheet 1
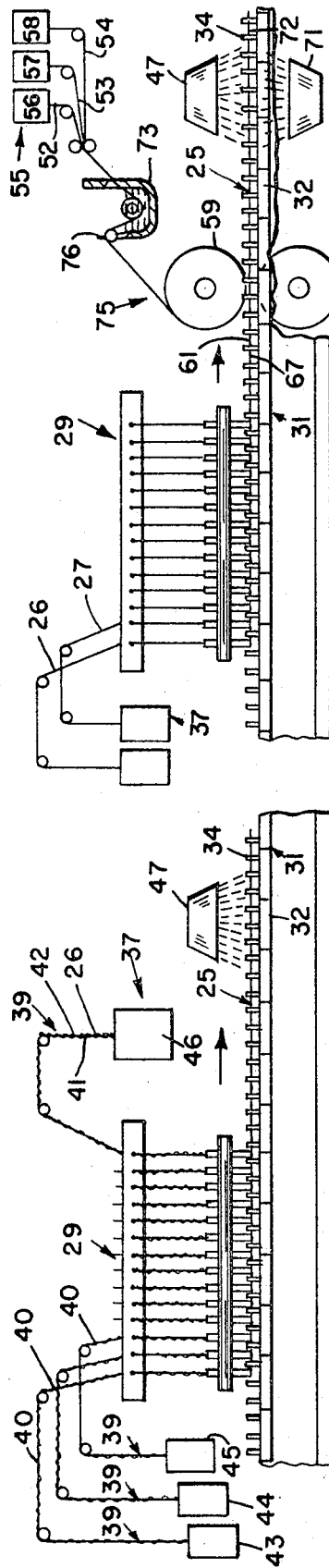
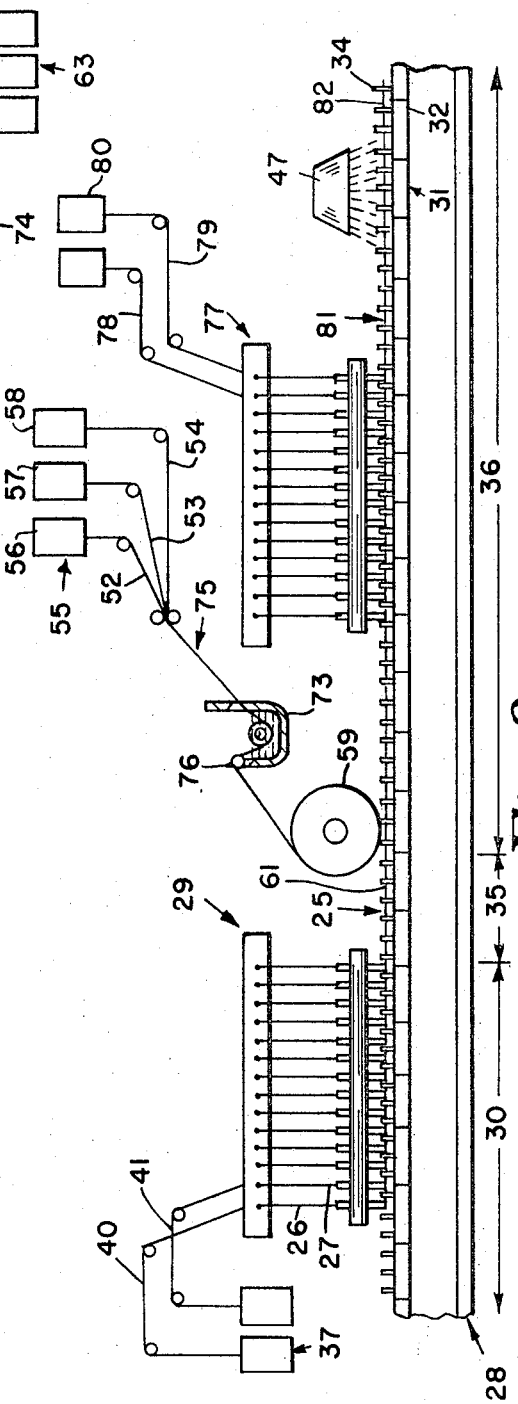
INVENTOR.
LESTER GIDGE
VALMOR R. POULIN JR.
BY Pearson + Pearson
ATTORNEYS

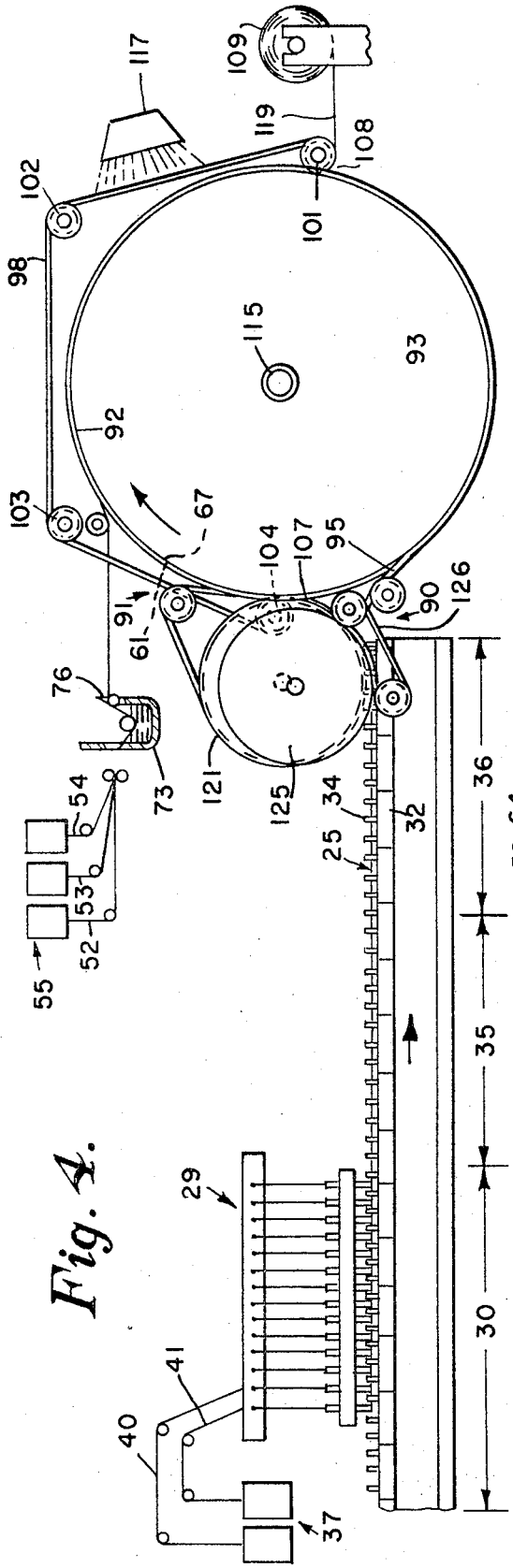
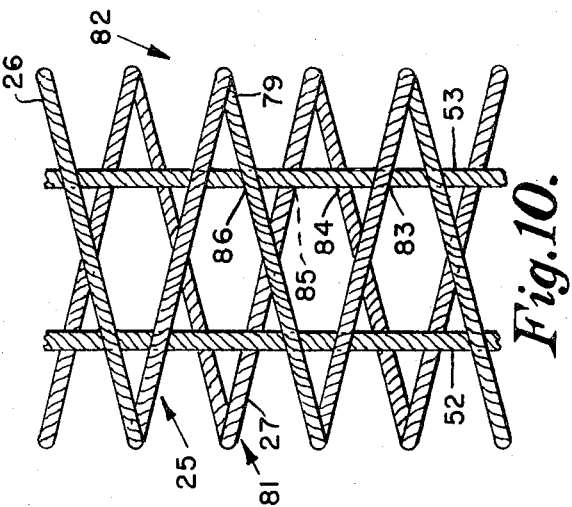
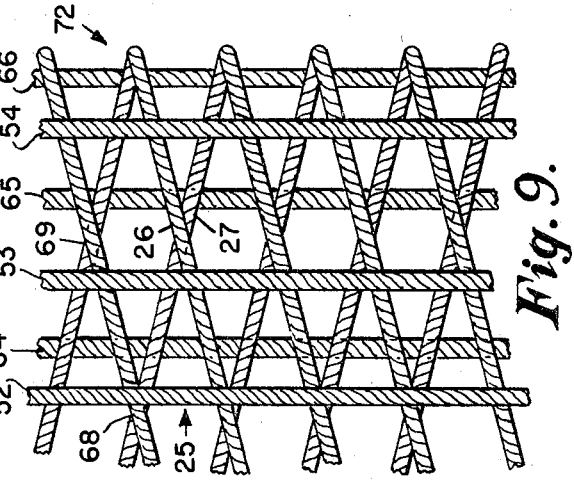
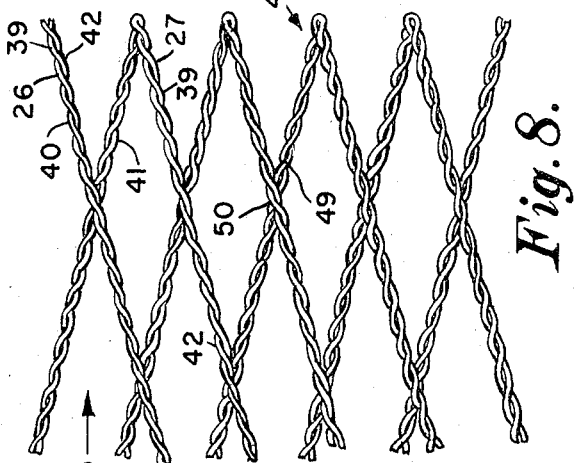

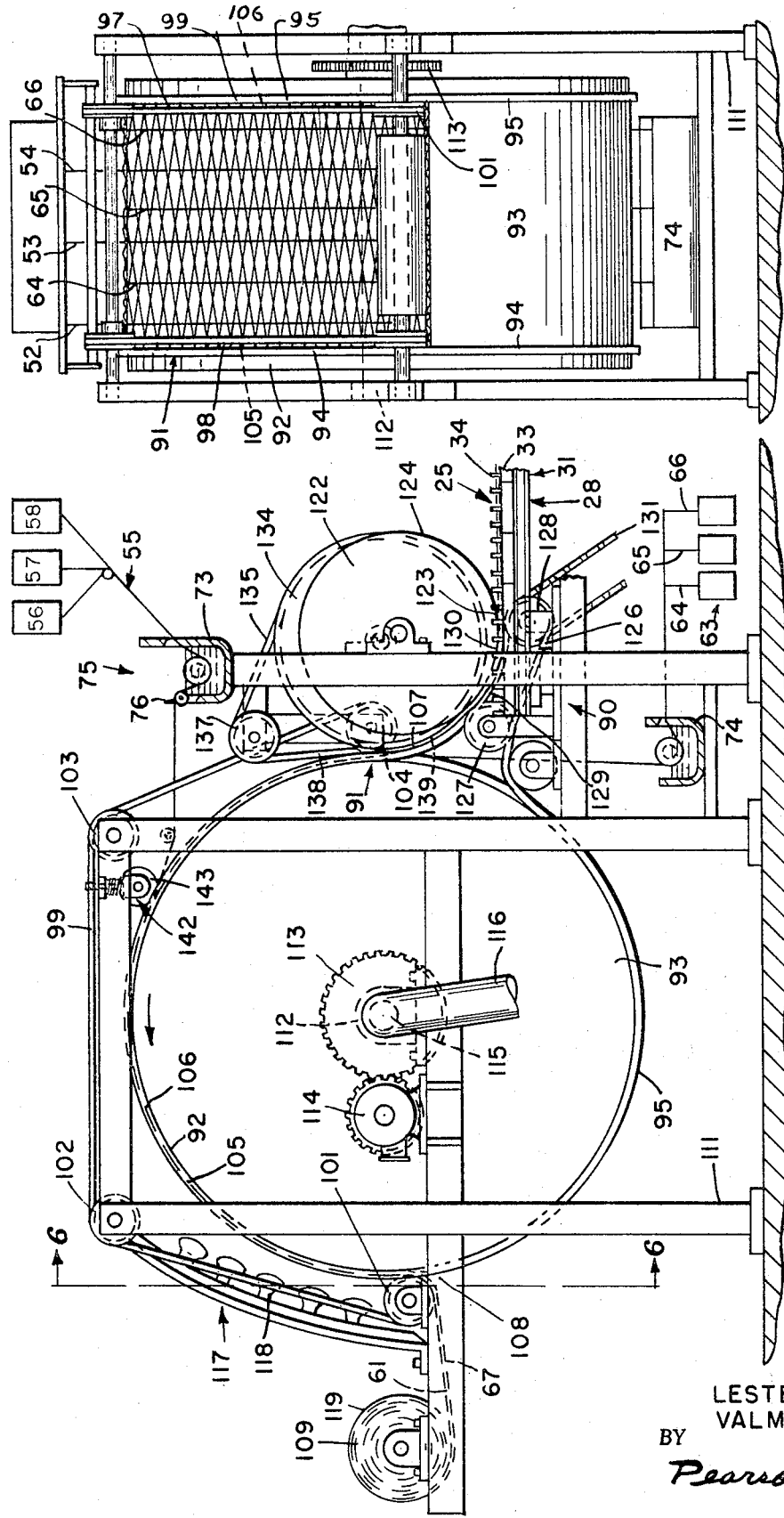

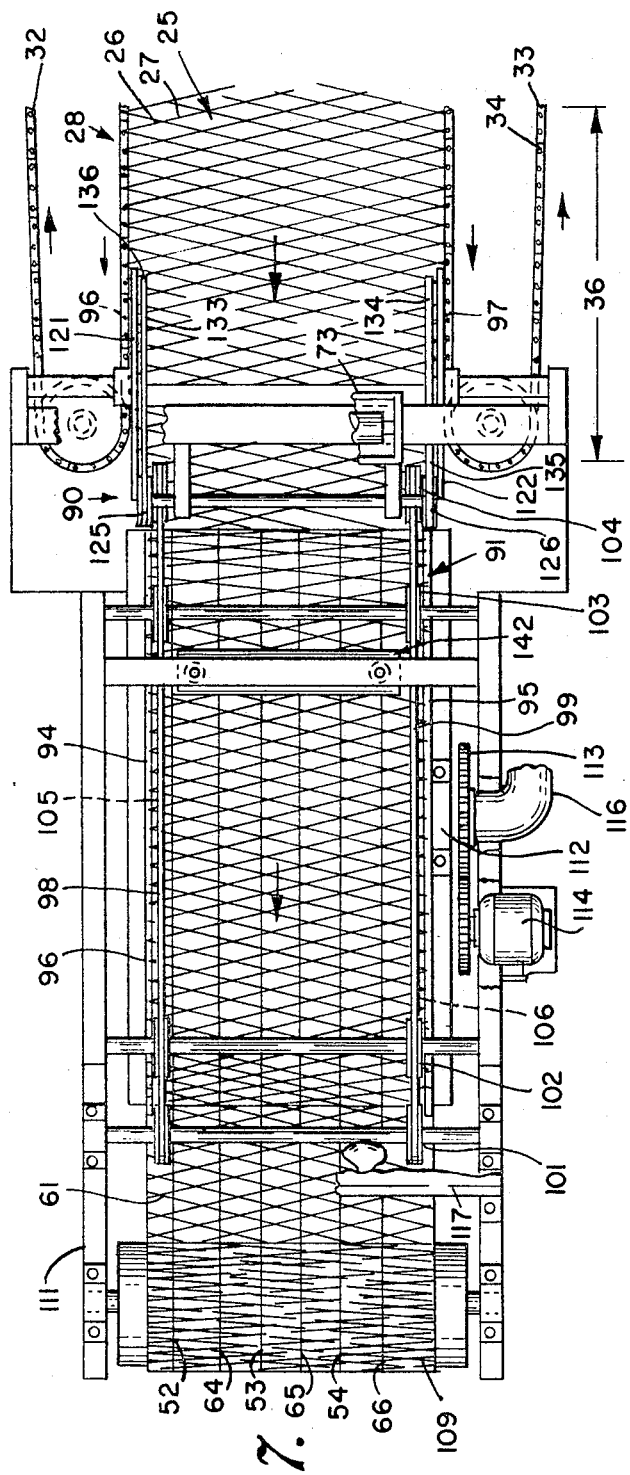
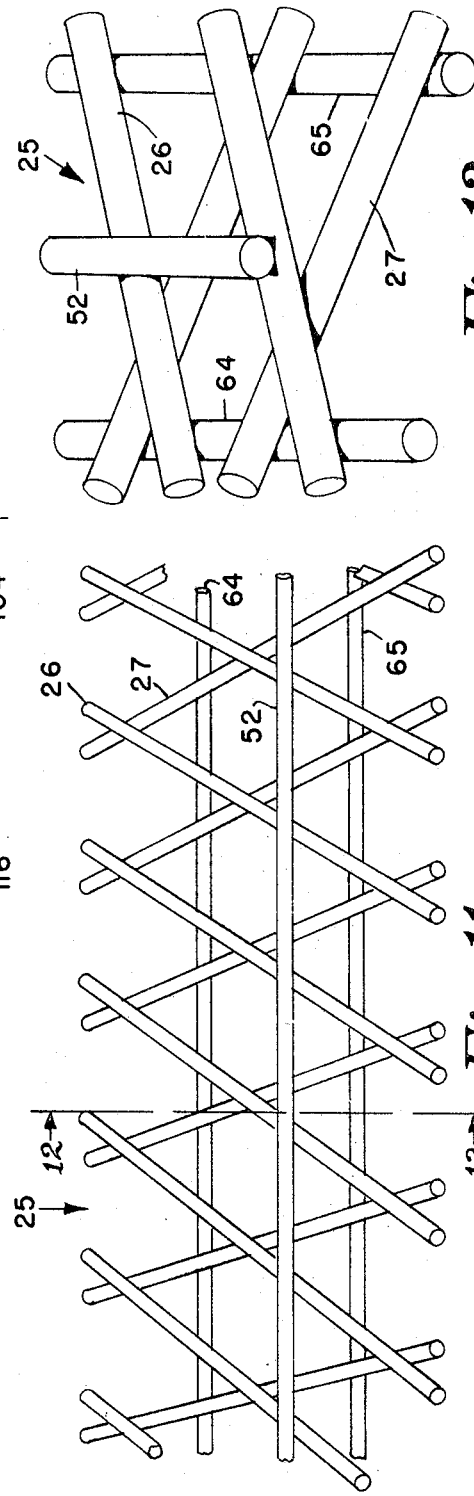

United States Patent Office 3,519,509
Patented July 7, 1970

3,519,509
NON-WOVEN NETWORK AND APPARATUS AND
METHOD FOR MAKING SAME
Lester Gidge and Valmor R. Poulin, Jr., Nashua, N.H., assignors to Union Carbide Corporation, a corporation of New York
Filed June 8, 1965, Ser. No. 462,347
Int. Cl. D04h *3/05;* B65h *23/02, 51/18*
U.S. Cl. 156—181                                    8 Claims

ABSTRACT OF THE DISCLOSURE

An apparatus and method for producing a unitary, non-woven, open-mesh network by first pre-forming a criss-cross, open-mesh, network from strands, free of adhesive, the network being advanced along a path with its selvedge edges maintained at a predetermined distance apart, then guiding a plurality of additional, or extra, adhesive strands longitudinally into superposed position on the pre-formed, open-mesh, network, in the spaces between the network intersections, and then further along the path setting the adhesive on said extra strands to adhere to both the upper and lower sets of criss-cross strands in the network to unitize the same, with the network strands still substantially free of any adhesive stiffness.

---

A non-unitary product of this type, having no inherent coherence and usable only when supported by web lamination, is disclosed in U.S. Pat. 2,812,797 to Estee of Nov. 12, 1957, and U.S. Pat. 1,460,949 to Currier of July 3, 1923. In each said patent the non-woven open mesh netting is either fabricated on an adhesive carrier web or is adhered to an adhesive carrier web after fabrication but while still supported on guides. The criss-crossed netted product of these patents would fall apart if stripped from the machine without adherence to the web.

In my U.S. patent application Ser. No. 349,931 filed Mar. 6, 1964, now U.S. Pat. No. 3,345,231, there is also disclosed a machine and method for making a criss-cross, non-woven, open mesh netting. As in the above mentioned patents, the product of my said application could be adhered to an adhesive web to form a laminated reinforced tape or the like. However, the said application also discloses the bonding of the strands of the network at their angularly disposed intersections to form a unitary, coherent material similar to onion bag netting. In addition to adhering or heat fusing the crossing points by a heater, my said application also discloses the joining of the crossing points of the strands by a shower of liquid, for example wire strands bonded by a shower of liquid solder.

In this application, the conversion of the criss-cross, open mesh, network into a coherent self sufficient, strippable unit, requiring no outside support, does not depend on using looped network strands impregnated with adhesive, or formed of heat settable material and does not depend on showering, or otherwise flooding the looped strands with adhesive. Instead, the invention of this application, lies in the use of looped criss-crossed strands of any suitable material which remain substantially free of adhesive stiffness, the strands being pre-formed into a taut, criss-cross network, advancing along a path and anchored against displacement to unitize the network by a plurality of extra adhesive strands added to the network. The extra strands, if of dry adhesive, can be twisted with each criss-cross strand for looping therewith or can, whether of wet, or dry, adhesive, be laid longitudinally into, or onto the advancing criss-cross netting and, when subsequently adhered or heat set to each other, or to the netting strands, serve to join the network strands into a strippable, self sufficient product.

It has heretofore been proposed in U.S. Pat. 2,902,395 to Hirschy of September 1959 to form a netting in which the netting longitudinal strands are adhesive and the cross-laid threads are normally thereto, non-adhesive and non-looped. In this invention, the criss-cross strands of the network may be entirely free of adhesive, while anchoring thereof is performed by extra adhesive strands, preferably added after the looping step and preferably reducing the size of the open mesh.

In the apparatus and method for making the product of the invention, the extra adhesive strands may be twisted around each of the multiple strands supplied to the looping mechanism prior to looping and may then be interbonded to each other by a heater on the discharge portion of the machine and the material then stripped. Preferably, however, extra strand supply means is mounted along the path of the pre-formed, advancing netting, in rear of the looping means to lay the extra adhesive strands on one, or both, faces of the criss-cross netting, accurately in the spaces between the netting intersections, the adhesive then being set to anchor the netting strands and the product then stripped. Alternatively, interbonding may take place while the product is moving along a raised, curved path and while the strands are being flattened by pressure to provide desirable tension on the longitudinal strands and increased areas of adhesion at the meeting points of the strands. The curved path may be in the form of a portion of the surface of a heated, rotating drum, with the netting transferred to the surface from the looping machine and gripped by its longitudinal edges while pressure and heat are applied for setting the adhesive.

The principal object of the invention is to provide an apparatus and method for making a criss-cross netting of criss-cross strands free of adhesive stiffness and unitized by adhesive strands which have been applied and adhered to the netting strands between the crossing points, which can be removed from a looping machine in a self sufficient unit requiring no support from an adhesive web and constituting an integral, useful network product whether flexible or rigid.

Another object of the invention is to provide a network which can be made at high speed without weaving and with a relatively open mesh but to which extra adhesive strands may also be added at high speed, and adhered to the strands of the network subsequent to the formation thereof to reduce the area of the mesh while anchoring all of the strands against displacement.

A further object of the invention is to provide novel means for transferring a criss-cross open mesh netting from the pins of a looping machine to the surface of a rotating drum, without disturbing the integrity of the netting, whereby the netting may be heat, or otherwise, treated on the drum to form an integral, strippable unit, or to form part of a laminated product.

Other objects and advantages of the invention will be apparent from the claims, the description of the drawings and from the drawings in which:

FIG. 1 is a diagrammatic side elevation of a looping machine, such as disclosed in my said copending application and showing extra adhesive strands twisted with the network strands prior to looping;

FIG. 2 is a view similar to FIG. 1 showing extra adhesive strands supplied to at least one face of the network, subsequent to looping;

FIG. 3 is a view similar to FIG. 1 showing extra adhesive strands supplied to at least one face of the network subsequent to a first looping and prior to a second looping;

FIG. 4 is a view similar to FIG. 1 showing extra adhesive strands supplied to at least one face of the network, after looping and after transfer to the surface of a rotating drum;

FIG. 5 is an enlarged side elevation of the drum shown in FIG. 4;

FIG. 6 is an end view in section on line 6—6 of FIG. 5;

FIG. 7 is a plan view of the drum shown in FIG. 5;

FIG. 8 is a fragmentary, enlarged plan view showing the network product of the invention with twisted adhesive strands;

FIG. 9 is a view similar to FIG. 8 showing the product of the invention with the extra strands adhered to each opposite face of the network, laterally offset and spaced away from the strand crossing point;

FIG. 10 is a view similar to FIG. 8 showing the product of the machine of FIG. 3 wherein the extra strands extend longitudinally between a pair of criss-cross nettings to anchor all of the strands together;

FIG. 11 is a fragmentary perspective view of the preferred product of the invention showing upper and lower extra strands laterally offset from each other, and FIG. 12 is a still further enlarged diagrammatic view of the product of FIG. 11, in section on line 12—12 of FIG. 11, showing the adhesive bonding areas.

The non-woven, criss-cross product with which this invention is concerned is sometimes called "scrim" in the art, perhaps incorrectly, and is termed "netting" in the above mentioned Currier and Hirschy patents and in my said copending patent application. To avoid the possible connotation of woven, or interlaced, netting or of crossing points joined by knotting, the product of this invention is termed a "network" meaning thereby that it may be limp and flexible, or stiffened by adhesives into semi, or full rigidity and that, without the anchoring effect of the extra adhesive strands, the material has no inherent interlocking or unitization.

A machine for producing a network 25 of criss-crossed, angularly disposed, strands 26 and 27 could be of the type shown in the said Currier Pat. 1,460,949 or of the type shown in the said Estee Pat. 2,812,797 but a machine 28, such as clearly disclosed in my copending application Ser. No. 349,931 is preferred. The machine 28, as disclosed therein and therefore not described in detail herein, includes a multiple strand looping member 29, oscillating transversely back and forth in a looping zone 30 and strand carrier means 31 comprising a pair of laterally spaced endless chains 32 and 33, each carrying spaced upstanding pins 34 and each extending from the looping zone 30 along a path through a spreading zone 35 to a stripping zone 36. (FIG. 4). The crossed strands 26 and 27 may be of any desired composition such as natural, or synthetic, fibres or filaments, for example cotton, nylon, fiberglass or the like each fed, or drawn, individually from strand supply means 37 to the loping member 29.

In one form of the invention, illustrated diagrammatically in FIG. 1, the strands 26 or 27 of network 25 are formed of non-adhesive, non-heat settable material such as cotton, but each forms part of a composite yarn, or strand, such as 40 or 41, there being extra bonding strand means 39 in the form of an adhesive strand such as 42 relatively closely, spirally, twisted with, or around, each non-adhesive strand. Thus each yarn package 43, 44, 45 or 46, of strand supply means 37, contains a composite yarn such as 40, which consist of an adhesive strand 42 twisted with a non-adhesive strand such as 26. The extra adhesive strands 42 are thereby introduced into the network 25, in advance of the looping zone and are looped therein as part of the composite yarns 40 and 41. In rear of the looping zone, the network 25, having the extra adhesive strands therein, is subjected to suitable treatment to cause the adhesive strands to adhere to each other and to adhere to any non-adhesive strands 26 or 27 in which they may be in contact. Preferably extra strands 42 contain a thermoplastic resin and the treatment means is a suitable infra red heater, oven, or the like, 47 mounted along the path of the network 25 and arranged to dry, or set, the resin during the passage of the network. The so unitized network 48 with its criss-crossed strands anchored against displacement by the adhesion of the extra strands, may be stripped from the carrier 31 in any suitable manner, as an integral unit. The unitized network 48, so stripped, is illustrated fragmentarily in FIG. 8 and it will be noted that the adhesive strands 42 are bonded and firmly secured to each other as at 49 at the crossing points 50 of the network.

In another, and more preferred form of the invention, as shown in FIG. 2, the machine 28 produces a criss-cross network 25 of strands 26 and 27 of any desired material and the extra adhesive strands are applied to the pre-formed, pin carried, network, in rear of the looping zone 30. The extra adhesive strands 52, 53, and 54, similar to strands 42, may be supplied from a warp type roll, but are preferably supplied by strand supply means 55, in the form of a plurality of parallel, individual, adhesive strands each wound in individual packages 56, 57 or 58 and carried on a creel of well known type, not shown. A guide 59, which may be a roll, is mounted transversely above the zone 36 of machine 28 to continuously lay the spaced apart, parallel, extra adhesive strands 52, 53 and 54 longitudinally on the upper face 61 of the network 25. A similar guide 62, and similar extra strand supply means 63, may also be provided to lay longitudinal extra adhesive strands such as 64, 65 and 66 on the lower face 67 of network 25. As shown in FIG. 9, the adhesive strands are preferably laterally spaced uniformly to engage the strands 26 and 27 of the network 25, between the crossing points, or intersections such as 68 or 69 and the lower strands are offset from the upper strands to reduce mesh size while firmly engaging each successive strand of the network. The adhesive strands preferably contain a thermoplastic resin which is set by the heaters 47 and 71, while the network is advancing along the discharge zone 36 of machine 28, so that the unitized product 72 of the invention may be stripped for further use without requiring the support of an adhesive web. The multiple strand guides 59 and 62, are preferably a pair of freely rotatable rolls forming a pressure nip, under controlled pressure of any well known type, and serve to flatten out the adhesive strands to increase their area of contact with the non-adhesive strands 26 and 27 of the network 25. The extra adhesive strands may be pre-impregnated with resinous to rubbery adhesives under controlled conditions and may be partially cured to a dry, or slightly tacky condition and then wound on packages and placed in the creel. As shown, in FIG. 2, the extra bonding strand means 75, formed by strands 52, 53 and 54, 64, 65 and 66 are preferably, however, passed over and under suitable rollers, or guides, and passed through an immersion bath of adhesive in a tank 73 or 74 at room temperature, the bath containing the particular adhesive desired.

The roller guides 59 and 62 may be circumferentially grooved to align each extra adhesive strand but it is preferred to provide a comb, or reed, 76 of the type used on a loom, the reed being mounted on the rim of the tanks 73 or 74 to establish and maintain the desired lateral alignment, and spacing of the adhesive strands.

As shown in FIG. 3, in another embodiment of the invention, a network 25 of criss-cross strands 26 and 27 may be fabricated on the machine 28 by a first looping member 29 and the network spread out as described in detail in my said copending application.

As in the embodiment of FIG. 2, extra bonding strand means 75, is then provided to apply a plurality of adhesive strands such as 52, 53 and 54, longitudinally, in parallelism, on the upper face 61 of the pre-formed, pin carried, advancing network 25. A second looping member 77, similar to looping member 29, is mounted in the stripping zone 36 and supplied with a plurality of network strands 78 and 79 from a supply means 80, identical with supply means 37, to fabricate a second criss-cross network 81 similar to network 25. The adhesive strands 52, 53 and 54 are thus sandwiched longitudinally between the upper and lower criss-cross networks and are adhered by the heating means 47, at spaced distance along the strands, to the criss-cross strands of both networks. The adhesive strands are adhered to the inside sets of strands of the networks, as well as to the outside sets of strands of both the networks to form the unitized network 82 which is a unitary, self sufficient structure, requiring no outside support and strippable without an adhesive web. It will be understood that looping member 29 normally oscillates at relatively high speed to create network 25 while the carriers 32 and 33 are closely spaced, the carrier means 31 continuing to advance network 25 at such speed. In the embodiment of FIG. 3, the oscillatory speed of member 29 is slowed down to permit looping member 77 to oscillate back and forth across the advancing network and member 77 is of suitable configuration to accommodate itself to the full width of the network.

While not shown herein, it will be apparent that in the device of FIG. 3 the looping member 77 could be fed with extra adhesive strands such as 52, 53 or 54 to fabricate a criss-cross network of adhesive strands on the network 25 and that the adhesive strand supply means 75 could then be eliminated. It will also be apparent that the looping member 29 could form a criss-cross network only on each alternate pin of the carriers 31 and 32 and the looping member 77 could then form a criss-cross network on the alternate pins not carrying loops, if desired.

The unitized network product 82 of the apparatus of FIG. 3 is shown fragmentarily in FIG. 10, the longitudinal strands such as 52 and 53 being adhesively bonded, along the length thereof, to the strands of the networks at spaced intervals such as at 83, 84, 85 and 86.

In FIGS. 4, 5, 6 and 7 the preferred embodiment of the machine and method of the invention is illustrated. In this case the machine 28 of my copending application is unchanged and delivers the criss-cross netting 25 to the end of the stripping zone 36 in non-unitized condition still dependent on support by the chain pins 34. The chains 32 and 33 are advancing at the predetermined, relatively high speed of the machine 28 and the meshes of the network 25 are of predetermined area, subject to the physical limitations of the machine, namely the space between the pins 34 on the chains which must be sufficient to pass the guides on the looping member 29. A smaller mesh can be secured by crowding the links, as taught in my said application, but this tends to slow down production rates.

In the embodiment of FIGS. 4, 5, 6 and 7 the machine 28 continues to produce network at high speed, but the network is released by the pins and delivered from the machine into the edge grip of loop transfer means 90, then released therefrom and regripped along the edges by loop retaining means 91 extending around a portion of the cylindrical face 92 of a drum 93, which forms a curved continuation, or extension, of the path of the network.

The loop retaining means 91 includes a pair of laterally spaced apart, continuous annular, outer loop retention belts 94 and 95 extending circumferentially around the smooth face 92 of drum 93, each aligned with one looped side edge portion 96 or 97 of the network 25. A pair of inner loop retention endless belts 98 and 99 are each trained around idler sheaves 101, 102, 103 and 104, each belt having a curved stretch 105 or 106 juxtaposed to one of the belts 94 or 95, just inside the same, and extending from an entrance throat 107 at loop transfer means 90 around the drum to an exit throat 108 in the vicinity of the unitized network wind-up roll 109. The belt stretches 105 and 106 are so tensioned as to pressure clamp the edges of network 25 against the drum face 92 while the looped edges thereof are bent at right angles, snubbed, pinched and clamped between adjacent inner and outer belts, to thereby retain the network in expanded, fully supported condition on the drum. A suitable drum frame 111, drum bearings 112, gear train 113 and drum drive motor 114 are provided to rotate the drum at a predetermined surface speed preferably less than the surface speed of the network chain pins 34.

The shaft 115 of drum 93 is hollow, and connected by a conduit 116 to a source of heat, such as mill steam, so that the drum face 92, of metal such as copper, may be heated to the desired temperature to cure, or dry the resin adhesive used on the extra strands. A suitable heater 117, corresponding to heater 47, for example a battery of infra-red bulbs 118 is mounted above the path of the network 25 on the drum 93 to heat the extra adhesive strands to the desired temperature of curing or drying, of the adhesive used. The extra strand supply means 55, adhesive tank 73 and reed 76 are mounted proximate the drum 93 to continuously supply a plurality of the soft, settable adhesive, extra strands 52, 53 and 54 longitudinally, in parallelism onto the upper face 61 of network 25. The extra strand supply means 63 is mounted proximate the drum 93, below the entrance throat 107 to similarly apply the adhesive strands 64, 65 and 66 to the lower face 67 of the network. The adhesive setting means 117, plus the heat of the drum if desired, sets the adhesive of the extra strands into hardened condition and bonds the extra strands to the network strands, so that the network becomes an integral unitized product 119 capable of winding into the roll 109.

The loop transfer means 90 includes a first pair of freely rotating, outer discs 121 and 122 each mounted proximate the end of the stripping zone 36, to rotate in a vertical plane on a horizontal axis above the end sprocket of the carrier chains 32 and 33. The lower centre 123 of the circumferential face 124 of each disc 121 or 122 is in the plane of the bottom of the adjacent pins 34, and just inside the pins, so that it rests on the network 25 just inside the looped edges 96 or 97 thereof. Means 90 also includes a first pair of endless pinch belts, 125 and 126, each trained around sheaves such as 127 and 128 and each having a stretch 129 mating with a segmental portion 130 of face 124 to pinch and clamp the looped edges 96 or 97 thereagainst while stripping the loops from pins 34 and pinch advancing the same upwardly toward the drum face in a curved path. The first discs 121 and 122 and the first pinch belts 125 and 126 travel at the speed of the pins by means of the drive train 131.

Means 90 also includes a second pair of discs 133 and 134, each proximate and just inside one of the discs 121 or 122 and each having one of a second pair of endless pinch belts 135 or 136 trained therearound and around an idler sheave such as 137. Each second pinch belt 135 or 136 has a stretch 138 which pinches and clamps adjacent edges 96 or 97 of network 25 against a stretch 139 of an outer belt 94 or 95 and which extends from in advance of the sheave 127 to in rear of the entrance throat 107. Thus each second disc and pinch belt grips a network edge about to be released by the first disc and pinch belt and retains its grip until the network edge has been regripped between an inner and outer loop retention belt on the drum.

The second discs and pinch belts travel at the surface speed of the drum, so that if the drum speed is 50% that of the chain pin speed, the mesh of the network 25 is reduced correspondingly in area with a corresponding shortening of the pitch and angle of the criss-cross strands, and with a shingling of the loops one over the other.

Rotating, strand flattening means 142 in the form of a spring-loaded pressure roll 143 is in pressure nip relationship with the surface 92 of drum 93 to press the extra strands into flat cross section for increasing the anchorage area thereof.

It will be seen that the non-unitized network 25 thus is passed from the support of the pins 34 along an extreme outside zone, to the grip of the first discs and belts in zones just inside the pin zone, thence to the grip of the second discs and belts in zones just inside the first disc and belt zone and finally to the grip of the outer and inner loop retention belts on the drum just inside the second disc and belt zones.

The drive of the second discs and belts at drum surface speed is secured by the contact of the second belts with the surface of the drum. The second discs and belts, are preferably offset slightly from normal to the face of the drum so that the network is pulled, expanded or stretched outwardly as it travels on the discs to maintain a substantially taut condition of the strands.

The types of adhesive with which the extra strands may be coated, pre-impregnated or impregnated may be as follows, depending on whether the unitized product is to be limp and flexible, semi-rigid or rigid and depending on the characteristics otherwise desired for the end use of the unitized, meshed product.

Among the thermoset resins, the polyesters, epoxides, phenolics, silicones, acrylics, melamines, etc., may be used, the resin mix containing any suitable fillers, catalysts, activators, inhibitors, pigments or other additives. Thermoplastics such as polyvinylchloride, copolymers of vinyl chloride and other ethylenically unsaturated monomers (such as vinyl acetate, vinyllidene chloride), polystyrene, polyamide (nylon), polycarbonates, styrene-acrylonitrile, chloro- or fluoro-carbon polymers Teflon and Kel-F may be used as the adhesive is desired. The resinous adhesives may be employed in the form of latexes, emulsions, solutions, melts and the like.

We claim:

1. The method of uniting an open mesh, criss-cross netting product into an integral, self-sufficient unit which comprises the steps of:
   first advancing said cross-cross netting along a path while said open-mesh netting is secured only at its opposite looped edges so that the strand intersections of the netting define spaced, parallel longitudinal paths;
   then continuously guiding a plurality of extra strands longitudinally onto said advancing network, said strands having a continuous surface of soft settable adhesive and being laterally spaced apart to each extend longitudinally in one of the spaces between the parallel paths defined by said strand intersections;
   releasing and resecuring the opposite looped edges of said network and advancing the same at a reduced speed to thereby reduce the mesh size thereof, prior to applying said extra strands;
   and then setting said adhesive, while said network is continuously advancing, to cause each said extra adhesive strand to bond at intervals therealong to each successive strand of said network, in the portion thereof between intersections, and to unify said network into an integral, self sufficient unit.

2. In a netting machine, the combination of:
   network carrier mechanism including a pair of longitudinally extending, laterally spaced, endless, support means for advancing a network along a path by engagement with the selvedges only thereof;
   network forming means, on said path, continuously producing a criss-cross, non-woven open-mesh network of strands free of adhesive, for advance along said path while selvedge engaged by said support means;
   adhesive strand supply means, mounted along said path, in rear of said network forming means, said supply means continuously supplying a plurality of settable adhesive strands onto said advancing pre-formed network;
   adhesive strand guide means, included in said strand supply means, said guide means establishing and maintaining alignment and spacing of said adhesive strands relative to the strand intersections of said pre-formed network;
   said adhesive strand supply means and said adhesive strand guide means including upper and lower opposed, circumferentially grooved rolls forming a pressure nip therebetween, each said roll guiding an upper, or lower, set of adhesive strands longitudinally onto one of the faces of said pre-formed network, in the spaces between the intersections thereof, and flattening said strands in advance of said adhesive setting means and
   adhesive setting means mounted along said path, in rear of said strand supply and guide means, said means setting the adhesive in said adhesive strands and anchoring the same to the strands of said network,
   whereby said pre-formed network strands are substantially free of adhesive stiffness but said adhesive stands unitize said network into an integral self sufficient unit.

3. In a netting machine, the combination of:
   network carrier mechanism including a pair of longitudinally extending, laterally spaced, endless, support means for advancing a network along a path by engagement with the selvedges only thereof;
   network forming means, on said path, continuously producing a criss-cross, non-woven open-mesh network of strands, free of adhesive, for advance along said path while selvedge engaged by said support means;
   adhesive strand supply means, mounted along said path, in rear of said network forming means, said supply means continuously supplying a plurality of settable adhesive strands onto said advancing pre-formed network;
   adhesive strand guide means, included in said strand supply means, said guide means establishing and maintaining alignment and spacing of said adhesive strands relative to the strand intersections of said pre-formed network;
   adhesive setting means mounted along said path, in rear of said strand supply and guide means, said means setting the adhesive in said adhesive strands and anchoring the same to the strands of said network,
   said carrier mechanism including a pair of longitudinally-extending, laterally-spaced, endless carriers having spaced upstanding pins thereon for receiving said looped strands and advancing said network along said path; a rotating cylindrical drum, having a portion of its circumferential face in said path for advancing said network further therealong, loop retaining means on each opposite side of said drum face for gripping the edges of said network to retain the same thereon and loop transfer means associated with said drum for stripping said network from said pins and delivering the network edges into said loop retaining means;
   and said adhesive strand supply means, adhesive strand guide means and said adhesive setting means are all mounted proximate said drum face,
   whereby said pre-formed network strands are substantially free of adhesive stiffness but said adhesive strands unitize said network into an integral self sufficient unit.

4. In a netting machine the combination of
   carrier mechanism, including a pair of longitudinally extending, laterally spaced, endless members having spaced upstanding pins for continuously advancing a network along a path;
   looping mechanism, at one end of said path, continuously criss-crossing a plurality of strands while wrapping the same around said pins for producing a non woven, network with open mesh of a predetermined size on said carrier mechanism;

a continuously rotating drum having a portion of its circumferential face forming a path extension, at the other end of said path, for supporting said network thereon;

loop retaining means, mounted along each opposite side of said drum face for gripping each opposite edge of said network to retain the same on said face;

loop transfer means mounted proximate the end of the path of said carrier mechanism for stripping the loops of said network from said pins and delivering the same into said loop retaining means;

extra strand supply means, mounted proximate said drum, said means continuously supplying a plurality of soft, settable, adhesive strands longitudinally, in parallelism, onto at least one face of said network;

and adhesive setting means mounted proximate said drum, in rear of said extra strand supply means, said means setting said adhesive into hardened condition;

whereby said hardened extra strands are bonded to the successive strands of said network to join the same into an integral, self sufficient unit.

5. A netting machine as specified in claim 4 wherein:
said extra strands are impregnated with a liquid thermoplastic resin, said adhesive setting means is a heater adapted to heat dry said resin and said drum includes heating means therewithin for drying said resin impregnated strands from the underside thereof.

6. A netting machine as specified in claim 4 wherein:
said loop retaining means on said drum comprises a pair of outer, and a pair of inner, loop retention belts, one said outer belt and one said inner belt extending around each side of said circumferential face;

each said outer and inner loop retention belt co-operatively pinching and snubbing the adjacent looped edge of said network to grip and retain the same in expanded condition while supported on the face of the drum.

7. A netting machine as specified in claim 4 wherein:
said loop transfer means comprises a first pair of freely rotating discs, each rotating with a surface speed equal to the speed of said endless members, a first pair of endless pinch belts, each having a stretch mating with a portion of the circumferential face of one of said discs, said stretch extending in a curved path from just inside the pins on one of said members to the surface of said drum for stripping the adjacent looped edge of said network from said pins and pinch advancing the same to said drum;

a second pair of discs, each proximate and inside one of the discs of said first pair, and each having one of a second pair of endless pinch belts trained therearound and extending to the face of said drum, said second belts each having a surface speed equal to that of said drum and being adapted to press the adjacent looped edge of said network against said drum face while receiving the same from the pinch of said first pairs of discs and belts.

8. A netting machine as specified in claim 4 wherein:
said carrier mechanism includes means for advancing said network with a predetermined mesh size at a predetermined speed;

said machine includes mechanism for rotating said drum at a predetermined surface speed less than the speed of said carrier mechanism, and said loop transfer means includes mechanism for receiving said network at the speed and mesh size of said carrier mechanism, reducing said speed to the speed of said drum and reducing said mesh size and transferring said network to the circumferential face of said drum.

References Cited

UNITED STATES PATENTS

| | | | |
|---|---|---|---|
| 2,956,754 | 10/1960 | Engelhardt | 242—157 X |
| 2,596,172 | 5/1952 | Ragan | 242—158.3 X |
| 2,797,728 | 7/1957 | Slayter et al. | 161—93 X |

ROBERT F. BURNETT, Primary Examiner

M. A. LITMAN, Assistant Examiner

U.S. Cl. X.R.

156—440, 441; 161—89, 156, 157